United States Patent
Lee et al.

(10) Patent No.: US 9,768,924 B2
(45) Date of Patent: Sep. 19, 2017

(54) TRANSMIT ANTENNA SELECTION

(71) Applicant: HEWLETT PACKARD ENTERPRISE DEVELOPMENT LP, Houston, TX (US)

(72) Inventors: Jung Gun Lee, Palo Alto, CA (US); Souvik Sen, Palo Alto, CA (US); Raul Etkin, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/912,070

(22) PCT Filed: Aug. 14, 2013

(86) PCT No.: PCT/US2013/055016
§ 371 (c)(1),
(2) Date: Feb. 12, 2016

(87) PCT Pub. No.: WO2015/023275
PCT Pub. Date: Feb. 19, 2015

(65) Prior Publication Data
US 2016/0191215 A1     Jun. 30, 2016

(51) Int. Cl.
*H04L 5/00*         (2006.01)
*H04B 7/06*         (2006.01)
*H04B 7/0413*       (2017.01)

(52) U.S. Cl.
CPC ........... *H04L 5/001* (2013.01); *H04B 7/0413* (2013.01); *H04B 7/0626* (2013.01); *H04B 7/0691* (2013.01); *H04L 5/006* (2013.01)

(58) Field of Classification Search
CPC ... H01Q 1/00; H01Q 1/32; H04B 1/38; H04B 1/44; H04B 7/00; H04B 7/02; H04B 7/04;
(Continued)

(56) References Cited

U.S. PATENT DOCUMENTS 8,046,029 B2    10/2011   Teo et al.
8,130,858 B1 *   3/2012   Lee ..................... H04B 7/0413
                                                    375/267
(Continued)

FOREIGN PATENT DOCUMENTS

EP    2320576 A2    5/2005
GB    2482197 A     1/2012
(Continued)

OTHER PUBLICATIONS

Engin Zeydan and Ufuk Tureli, "Differential Space-Frequency Group Codes for MIMO-OFDM," Mar. 14-16, 2007, pp. 542-547, IEEE.
(Continued)

*Primary Examiner* — Shawkat M Ali
(74) *Attorney, Agent, or Firm* — Hewlett Packard Enterprise Patent Department (57) ABSTRACT

A set of antennas is selected from a plurality of antennas for transmitting data streams on a plurality of subcarriers based on channel state information of a communications channel between the plurality of antennas and a plurality of receive antennas at a client device, a number of the data streams to be transmitted, and a channel coherence time of the communications channel. A size of the set is equal to or greater than the number of data streams.

15 Claims, 4 Drawing Sheets

(58) Field of Classification Search
CPC ... H04B 7/06; H04B 7/10; H04B 7/24; H04B 7/0413; H04B 7/0626; H04L 1/02; H04L 5/00; H04L 5/001; H04L 5/006; H04L 27/00; H04L 27/28; H04W 40/00; H04W 72/04; H04W 84/12; H01C 1/00
USPC ........ 370/252, 329, 338; 375/260, 267, 295, 375/299, 346, 347; 455/78, 121, 193.1, 455/272, 500, 507, 522
See application file for complete search history.

(56) References Cited

U.S. PATENT DOCUMENTS

| | | | | |
|---|---|---|---|---|
| 2004/0196919 | A1* | 10/2004 | Mehta | H04B 7/061 375/267 |
| 2005/0075081 | A1* | 4/2005 | Catreux-Erceg | H04B 7/061 455/78 |
| 2005/0190849 | A1* | 9/2005 | McNamara | H04B 7/0691 375/267 |
| 2005/0195912 | A1* | 9/2005 | Kim | H04B 7/0417 375/267 |
| 2007/0258392 | A1* | 11/2007 | Larsson | H04B 7/0417 370/310 |
| 2008/0139153 | A1* | 6/2008 | Tuo | H04B 17/391 455/277.2 |
| 2009/0124290 | A1 | 5/2009 | Tao et al. | |
| 2010/0040163 | A1* | 2/2010 | Caire | H04L 1/0003 375/261 |
| 2010/0220675 | A1 | 9/2010 | Chun et al. | |
| 2010/0232533 | A1* | 9/2010 | Lee | H04B 7/0417 375/267 |
| 2010/0322351 | A1* | 12/2010 | Tang | H04B 7/024 375/316 |
| 2011/0012798 | A1* | 1/2011 | Triolo | H01Q 3/24 343/713 |
| 2011/0044376 | A1* | 2/2011 | Lin | H04B 7/0608 375/130 |
| 2011/0128924 | A1* | 6/2011 | Coon | H04B 7/068 370/329 |
| 2012/0014469 | A1* | 1/2012 | Zhou | H04B 1/71072 375/267 |
| 2012/0069768 | A1* | 3/2012 | Ghassemzadeh | H04B 7/061 370/252 |
| 2012/0315938 | A1 | 12/2012 | Van Nee et al. | |
| 2012/0320898 | A1 | 12/2012 | Sung et al. | |

FOREIGN PATENT DOCUMENTS

| | | |
|---|---|---|
| KR | 10-2008-0043671 A | 5/2008 |
| WO | WO-2009/060650 A1 | 5/2009 |

OTHER PUBLICATIONS

International Search Report and Written Opinion, International Application No. PCT/US2013/055016, dated May 23, 2014, pp. 1-8.

Shan Chu et al., "Computing Efficient Antenna Selection Algorithms for MIMO-OFDM Systems," Jun. 25-28, 2006, pp. 1007-1011, IEEE.

* cited by examiner

Select a set of antennas from a plurality of antennas for transmitting data streams on a plurality of subcarriers based on channel state information (CSI) of a communications channel between the plurality of antennas and a plurality of receive antennas at a client device, a number of data streams to be transmitted, and a channel coherence time of the communications channel, where a size of the set is equal to or greater than the number of data streams

TRANSMIT ANTENNA SELECTION

BACKGROUND

In multiple-input-multiple-output (MIMO) systems multiple antennas are used to improve wireless performance by increasing transmission throughputs and link reliability. MIMO increases network capacity without increasing network bandwidth. MIMO may be combined with orthogonal frequency division multiplexing (OFDM) to provide an efficient way to combat the frequency selective fading of wireless channels by dividing the total bandwidth into many narrowband subcarriers.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Transmit diversity is the use of multiple transmit antennas to improve the performance and reliability of a communication network, by reducing the effects of multipath fading. Because each transmit-antenna to receiver-antenna path may suffer from deep channel fading, using multiple antennas may reduce the effects of multipath fading by increasing the chances of receiving strong signals at the receiver that have not suffered from fading. Thus, MIMO systems can substantially improve wireless link performance by increasing the reliability when implementing spatial diversity schemes (i.e., use of multiple antennas, usually with the same characteristics, that are physically separated from one another) or by increasing the data rate when implementing spatial multiplexing scheme (i.e., transmitting independent and separately encoded data streams from multiple antennas).

However, under certain conditions, multi-antenna transmissions are subject to a transmit power reduction by governmental regulatory bodies in many countries. For example, in the United States, the Federal Communications Commission (FCC) subjects multi-transmissions to a transmit power constraint that depends on the number of data streams transmitted. The FCC regulation aims to overcome the increase in energy radiated in a given direction due to beamforming or correlation gains by reducing the allowed maximum transmission power by a factor of:

$$10 \log\left(\frac{N_{tx}}{N_s}\right) \quad \text{Equation (1)}$$

where $N_{tx}$ is the number of antennas used for a transmission, and $N_s$ is the number of data streams to transmit. In case of an institute of electrical and electronics engineers (IEEE) 802.11n/ac MIMO system, $N_s$ is the number of spatial time streams that are produced by spatial multiplexing and spatial time block coding (STBC).

Accordingly, for MIMO systems, the number of antennas selected for transmitting data streams cannot be smaller than the number of data streams (i.e., $N_{tx}$ must always be equal to or greater than $N_s$). When $N_{tx}=N_s$, the maximum power reduction according to the FCC regulation of Equation (1) becomes zero, meaning that there is no power reduction. Thus, one way of overcoming the FCC reduction in transmit power is to limit the number of antennas used in a transmission (i.e., $N_{tx}$) to $N_s$. As $N_{tx}$ is reduced, the power reduction also reduces, thereby enabling or permitting the transmitter to use more power. However, using fewer transmit antennas reduces the transmit diversity (i.e., the chances of overcoming the effects of fading). Based on the FCC constraint of Equation (1), a solution may be to use a number of transmit antennas, $N_{tx}$ equal to the number of data streams $N_s$ to be transmitted (i.e., $N_{tx}=N_s$ and $10 \log (N_{tx}/N_s)=0$) to achieve a lowest power reduction. In this solution, it is important to select the optimal or right set of transmit antennas $N_{tx}$ out of a total antennas $N_{ant}$ available at the transmitter.

However, selecting the optimal/right set of antennas is not trivial. For example, to select an optimal set of transmit antennas, a full CSI matrix of size $N_{ant} \times N_{rx\_ant}$ is needed, where $N_{rx\_ant}$ is the number of antennas at the receiver (e.g., a client device). IEEE 802.11n/ac standards include a channel sounding protocol for a transmitter (e.g., an access point) to learn the CSI for the downlink channel to each client device, so that the access point can perform beamforming (i.e., directional signal transmission or reception), multi-user MIMO (e.g., in an IEEE 802.11ac standard), and/or transmit antenna selection by using the CSI information. However, channel sounding is optional and not all access points and client devices may support this feature. Moreover, where channel sounding is implemented, it incurs a large overhead and may drastically degrade the throughput. To illustrate, CSI is known to be stable over 100 ms duration in typical indoor environment when both the transmitter and receiver nodes are stationary. This duration is known as channel coherence time, $T_C$, and it decreases down to 10 ms at walking speed. Thus, performing channel sounding every 10 ms incurs unnecessary overhead. Further, it may be difficult to have accurate CSI information before every transmission.

One method for the transmitter to infer CSI to the receiver without explicit channel sounding is to leverage channel reciprocity. In channel reciprocity, for a given link between the transmitter and the receiver, the CSI of the link (i.e., H) from node A to node B is reciprocal to the B-to-A link (i.e., H'). If node A can obtain the reverse link CSI, H', from a packet transmitted from node B, node A can use this information to infer H for the A-to-B link channel, which is needed for node A to select the optimal set of transmit antennas. Thus, node A needs a full H of $N_{ant}(A) \times N_{ant}(B)$. However, the reverse link transmission from node B may user a precoding matrix Q for transmission, thus leading node A to learn H'Q instead of H', making it difficult for node A to recover the complete CSI, H. Thus, it may be desirable for an antenna selection technique that is usable when there is either a complete CSI or incomplete CSI (e.g., inferred CSI).

Accordingly, examples described herein address the above challenges by providing a technique for selecting an optimal set of transmit antennas for each OFDM subcarrier while considering FCC power constraints and practical limitations in obtaining accurate channel state information (CSI) for every transmission. The optimization solution presented may be defined as maximizing a given utility function, F, described in detail below.

In one example, a method for selecting transmit antennas at a wireless communications device includes selecting a set of antennas from a plurality of antennas for transmitting data streams on a plurality of subcarriers based on channel state information (CSI) of a communications channel between the plurality of antennas and a plurality of receive antennas at a client device, a number of the data streams to be transmitted, and a channel coherence time of the communications channel, where a size of the set is equal to or greater than the number of data streams.

In another example, a wireless communications device includes a plurality of antennas to transmit a number of data streams to a client device, and an antenna selection module. The antenna selection module is to select a set of antennas from the plurality of antennas based on channel state information (CSI) of a communications channel between the plurality of antennas and a plurality of receive antennas at the client device, the number of data streams to be transmitted, and channel coherence time of the communications channel, where a size of the set is greater than or equal to the number of data streams, and where the size of the set is subject to a transmit power constraint.

In another example, a non-transitory computer-readable storage medium includes instructions that, when executed by a processor of a wireless communications device, causes the processor to select a set of antennas from a plurality of antennas to transmit a plurality of data streams to a client device based on channel state information (CSI) of a communications channel between the plurality of antennas and a plurality of receive antennas at the client device, a number of data streams to be transmitted, and a channel coherence time of the communications channel. A size of the set is greater than or equal to the number of data streams to be transmitted, and the size of the set is subject to a transmit power requirement of the wireless communications device.

As used herein, "data stream" or "data streams" is a sequence of digitally encoded coherent signals (e.g., packets of data or data packets) used to transmit or receive information that is in the process of being transmitted. As used herein a "wireless communications device" is any wireless communications node that includes one or more antennas for transmitting and receiving data packets and/or signals. For example, the wireless communications device may include a base station, a wireless access point, a router, an ad-hoc device, a station, or any other node. As used herein a "subcarrier" is a separate analog or digital signal carried on a main radio transmission, which carries extra information such as voice or data. A subcarrier represents an already-modulated signal, which is then modulated into another signal of higher frequency and bandwidth. As used herein "channel state information (CSI)" refers to known (or inferred) channel properties of a communication link. CSI describes how a signal propagates from a transmitter to a receiver and represents the combined effect of, for example, scattering, fading, and power decay with distance. As used herein "channel coherence time" is the time duration over which the channel impulse response is considered to be not varying. A communication channel may change with time and the channel coherence time captures the change of the channel over time. As used herein "orthogonal frequency-division multiplexing (OFDM) is a method of encoding digital data on multiple carrier frequencies. As used herein "optimal set/number of transmit antennas" is a set/number of antennas selected from a plurality of available antennas at the transmitter for transmitting data streams based on a maximization solution of a function that includes a specified set of parameters.

Figure 1:
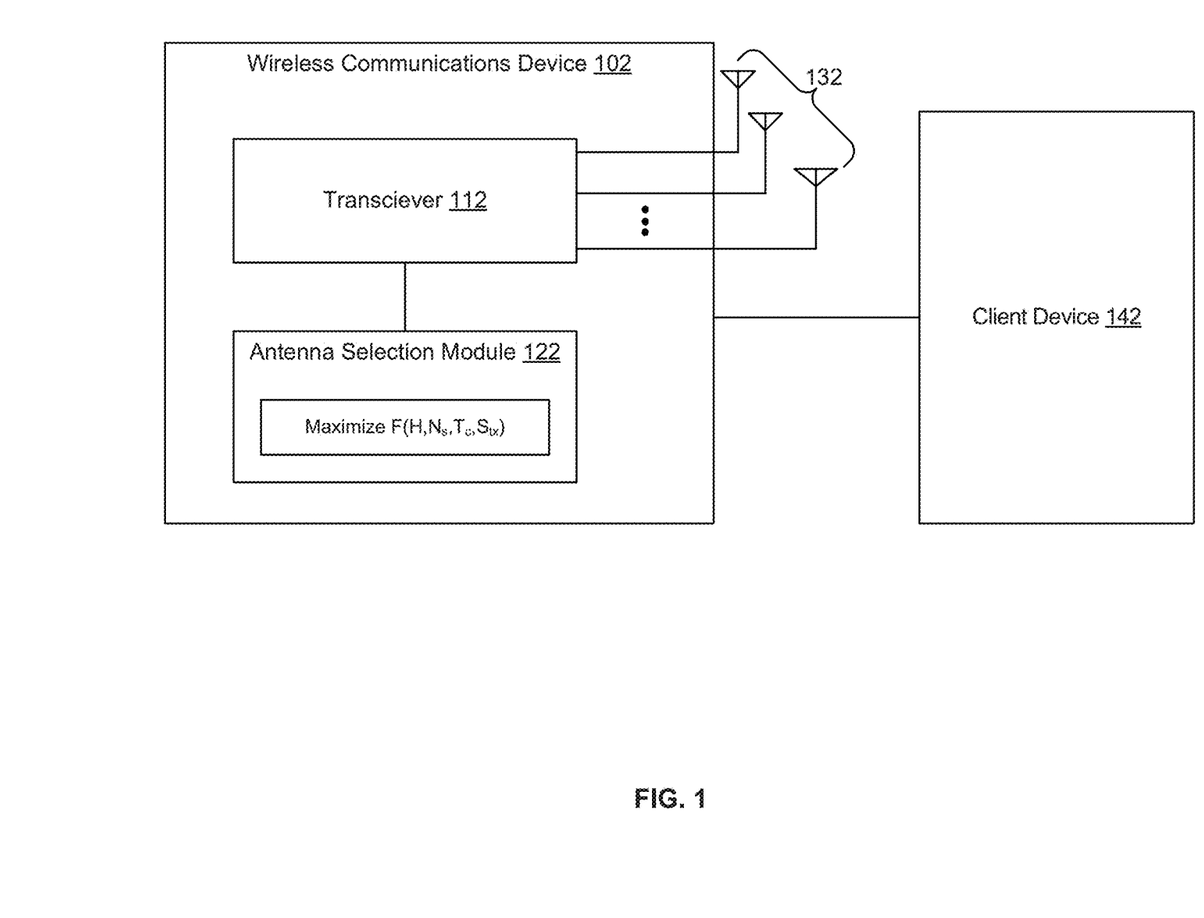
FIG. 1 is a block diagram of a wireless communications device including an antenna selection module for selecting transmit antennas, according to one example.

With reference to the figures, FIG. 1 is a block diagram of a wireless communications device 102 that includes an antenna selection module 122 for selecting transmit antennas, according to one example.

Wireless communications device 102 may be, for example, a wireless access point, a base station, an ad-hoc device, or any other communications node that serves and provides a plurality of client devices such as client device 142 with access to a network (e.g., cellular network, wireless local area network, ad-hoc network, etc.). Client device 142 may be, for example, a cellular device, a laptop, a smartphone, a desktop PC, a personal digital assistant (PDA), an access point, another wireless communications device, or any other communication node that depends on wireless communications device 102 for network access. Client device 142 may be fixed, mobile, or portable.

Wireless communications device 102 includes a transceiver 112 and an antenna selection module 122. Transceiver 112 includes a plurality of antennas 132 for communicating with client device 142. For example, transceiver 112 includes antennas 132 for transmitting data streams to the client device 142 and for receiving data streams from the client device 142.

Antenna selection module 122 may be hardware and/or software configured to select a set of antennas from the plurality of antennas 132 for transmitting data streams on a plurality of subcarriers (e.g., OFDM subcarriers) based on channel state information (CSI) (complete or incomplete) between the device 102 and the client device 142, the number of data streams to be transmitted, and a channel coherence time between the device 102 and the client device 142. Antenna selection module 122 may be coupled to the transceiver 112. Accordingly, antenna selection module 122 is configured to select an optimal set of antennas for each OFDM subcarrier while considering FCC power regulations and other factors/constraints. In one example, the optimal antenna selection performed by the antenna selection module 122 can be defined as maximizing a given utility function, F, described in further detail below.

In this example, a utility function, F, is defined for selecting a set of transmit antennas for a given transmission depending on the channel state information (CSI) available at the transmitter. Knowledge about the CSI, and information about the variability of the CSI over time and frequency are exploited to select an appropriate set of transmit antennas based on the constraint on the transmit power imposed by FCC regulations.

The utility function $F(H,N_s,T_c,S_{tx})$ is used to compute a performance metric for an expected throughput or 1-BER (Bit Error Rate), as a function of currently available CSI (H), the number of data streams to be transmitted ($N_s$), the channel coherence time ($T_c$), a set of selected transmit antennas ($S_{tx}$) to be used for transmission. $S_{tx}$ is a subset of $S_{ant}$, the set of entire antennas available at the transmitter. Thus, $N_{tx}=|S_{tx}|$ and $N_{ant}=|S_{ant}|$, where $|S_{tx}|$ is a size of the selected set of antennas, and $|S_{ant}|$ is the size of the available plurality of antennas. Assuming that H is a full CSI of $N_{ant} \times N_{rx\_ant}$, the optimization equation can be written as:

maximize $F(H,N_s,T_c,S_{tx})$, where the control parameter is $S_{tx}$ and the constraint is $|S_{tx}|>=N_s$. The antenna selection module 122 performs the above optimization per OFDM subcarrier. Accordingly, in certain examples, a different set of antennas $S_{tx}$ may be selected for each OFDM subcarrier. Further, the FCC regulation is taken into account, to achieve a maximum transmit power reduction (i.e., $|S_{tx}|>=N_s$), when computing F. When H is a complete CSI, the function F can be solved using optimization solvers/techniques such as integer linear or non-linear algorithms and/or programming tools. The linearity or non-linearity of the problem will be determined by how the function F is defined.

Various illustrations of optimal antenna selection using the function F are explained below, as examples. In one example, consider a 2×1 multiple-input-single-output (MISO) system, where $N_{ant}=2$ and $N_{rx\_ant}=1$, with per-subcarrier channel responses h1 and h2: $H=[h1\ h2]^T$. Assume further that the number of data streams, $N_s=1$. If $|h1|\approx|h2|$, antenna selection module 122 may select both transmit antennas at the device 102 (i.e., $N_{tx}=2$) for transmission, knowing that the 3 dB (i.e., approximate value of $10\log(N_{tx}/N_s)$ or $10\log(2/1)$) loss in transmit power due to the FCC power constraint can be compensated for by beamforming gain. Thus, function F is maximized when $S_{tx}=\{TX\ antenna\ 1, TX\ antenna\ 2\}$. Put differently, function F is maximized when both antennas at the transmitter are selected for transmission of one data stream, in this example. It should be noted that $|h1|$ is the signal-to-noise-ratio (SNR) of channel response h1 while $|S_{ant}|$ is the size of the set $S_{ant}$.

On the other hand, if $|h1|>>|h2|$, antenna selection module 122 may select only one transmit antenna (e.g., TX antenna 1). Thus, function F is maximized when $S_{tx}=\{TX\ antenna\ 1\}$. In cases where the channel has a small channel coherence time $T_c$, the antenna selection function F favors transmission modes with more diversity gain, thus selecting both transmit antennas. In cases of slowly fading channels and where accurate channel estimates are available, more aggressive transmission strategies that use more power and fewer transmit antennas may be beneficial. Thus, where complete CSI information, H, is available, the antennas selection module 122 can find the optimal set of transmit antennas for each subcarrier such that the function F is maximized.

It should be noted that the above examples allow for different number of transmit antennas to be selected for each subcarrier. However, in some examples, it may be necessary to use the same number of transmit antennas across all OFDM subcarriers (i.e., $N_{tx}=|S_{tx}|$, for example due to regulations. In such examples, a homogeneous constraint $|S_{tx}|$ is added for all subcarriers. It should be noted that although different set of transmit antennas may be used for different subcarriers, in this example, the number of antennas (i.e., the size of the selected set) used for each subcarrier is the same across all the subcarriers. To select a different set of antenna for each subcarrier, while maintaining the same number of antennas across the subcarriers, the antenna selection module 122 may first select the right number of antennas to use. Thus, the antenna selection module 122 can determine $|S_{tx}|$ from the range of integers $[N_s, N_{ant}]$, where $N_{ant}=|S_{ant}|$. Next, the antenna selection module 122 may select the right set (i.e., optimal) of transmit antennas from the available antennas for each OFDM subcarrier, that is equal to the number (or size) of transmit antennas determined above.

The number of transmit antennas $|S_{tx}|$ is determined based on the channel coherence time $T_c$ between the device 102 and the client device 142. For example, for shorter channel coherence time $T_c$, a larger number of transmit antennas $|S_{tx}|$ may be selected to improve diversity gain against the fluctuating channel state while paying more transmit power penalty due to the regulation of Equation (1). The right set of transmit antennas from the available antennas may be selected based on the CSI factor, H for each subcarrier, while adhering to the number of transmit antennas of the first step, such that the function F is maximized. For example, transmit antennas with the largest SNR gains $|h\_i|$ may be selected, where I is the antenna index (i.e., i=1, 2, . . . , $N_{ant}$). When the complete CSI H is available, the antenna selection module 122 can optimally determine the global number of transmit antennas $|S_{tx}|$ to be used for all subcarriers, and the set of antennas $S_{tx}$ for each subcarrier without using any further heuristics.

In examples where there is incomplete CSI information H (e.g., where CSI is inferred from precoding matrix Q), the optimal set of transmit antennas can be selected using the above steps, where the right number of antennas $|S_{tx}|$ is first determined based on the channel coherence time $T_c$, and the right set of antennas $S_{tx}$ is selected based on antennas having the largest SNR gains. Accordingly, in a scenario where there is complete CSI or in another scenario where there is incomplete CSI, an optimal set of transmit antennas may be selected based on a solution of the function F described above, where the function includes a number of parameters including the channel coherence time $T_c$. For example, when the channel coherence time is low, the function F may favor using more transmit antennas. However, when the channel coherence time $T_c$ is high, the function F may favor using less transmit antennas.

Figure 2:
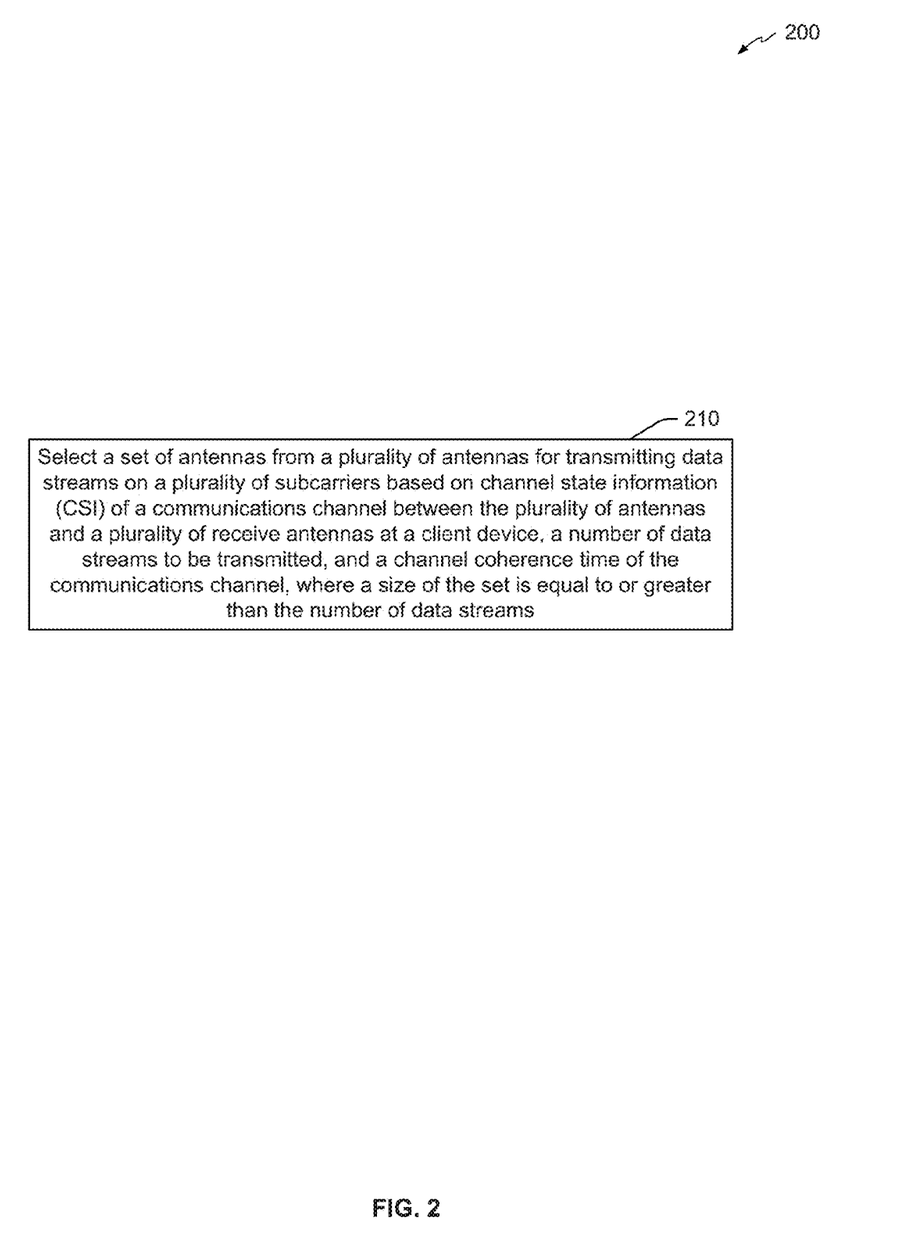
FIG. 2 is a flowchart of a method for selecting transmit antennas at a wireless communications device, according to one example.

FIG. 2 is a flowchart of a method for selecting transmit antennas at a wireless communications device, according to one example. Method 200 may be implemented, for example, in the form of executable instructions stored on a non-transitory computer-readable storage medium and/or in the form of electronic circuitry.

Method 200 includes selecting a set of antennas from a plurality of antennas for transmitting data streams on a plurality of subcarriers based on channel state information (CSI) of a communications channel between the plurality of antennas and a plurality of receive antennas at a client device, a number of data streams to be transmitted, and a channel coherence time of the communications channel, where a size of the set is equal to or greater than the number of data streams, at 210. For example, the antenna selection module 122 may select an optimal set of antennas from a plurality of available transmit antennas using an optimization solution of a function, where the arguments of the function include the CSI, the number of data streams to be transmitted, the channel coherence time, and the set of antennas, and where the control parameter is the set of antennas. A size of the set of antennas selected is subject to transmit power requirements, and the size of the set of antennas selected is equal to or greater than the number of data streams. Further, the optimization solution is applicable where there is complete or incomplete/partial CSI. For example, the antenna selection module 122 may select the optimal set of antennas where there is a full CSI matrix determined by the use of channel sounding protocols, or where there is a partial or incomplete CSI inferred from precoding matrix.

Figure 3:
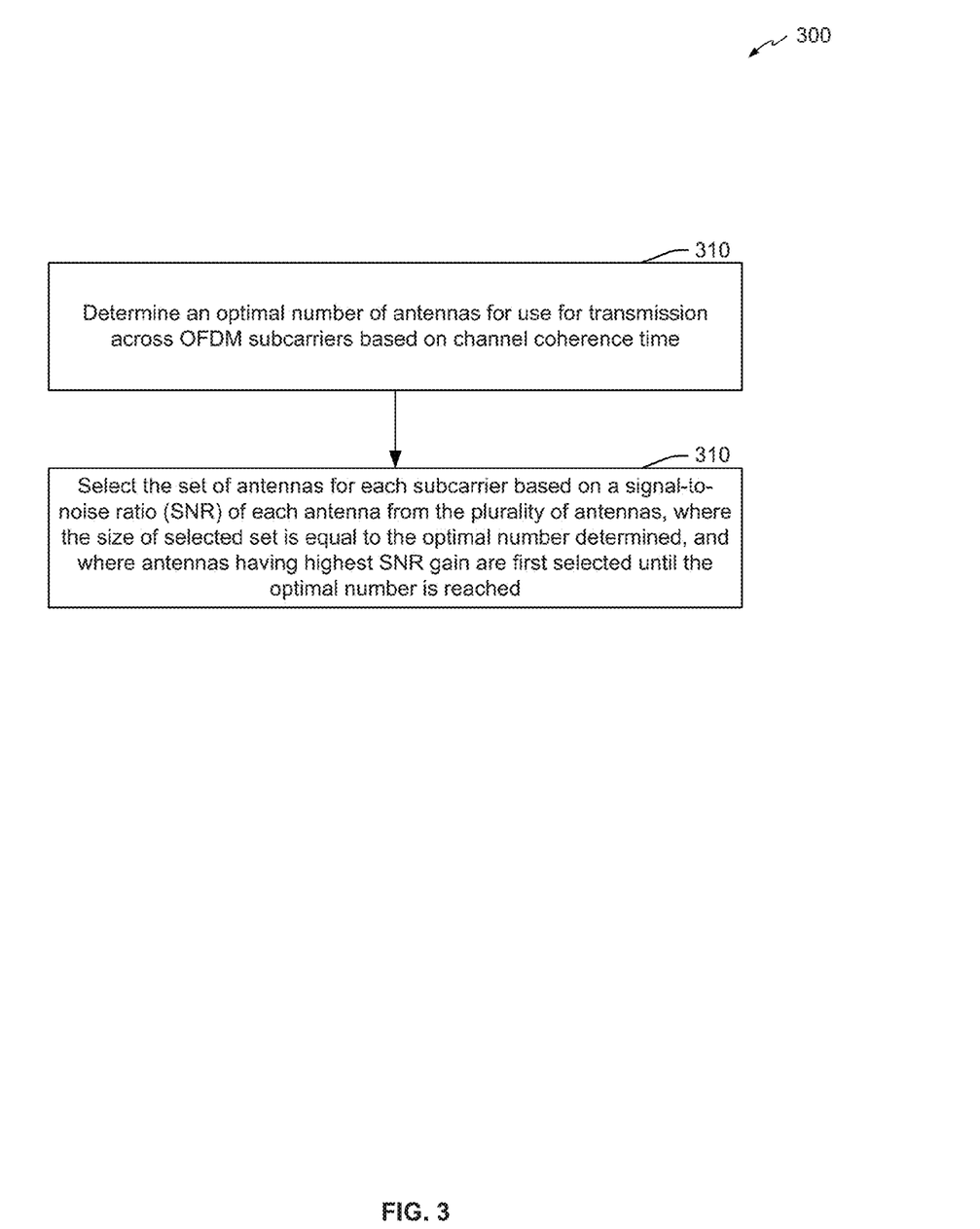
FIG. 3 is a flowchart of a method for selecting transmit antennas at a wireless communications device, according to one example.

FIG. 3 is a flowchart of a method for selecting transmit antennas at a wireless communications device, according to one example. Method 300 may be implemented, for example, in the form of executable instructions stored on a non-transitory computer-readable storage medium and/or in the form of electronic circuitry.

Method 300 includes determining an optimal number of antennas for transmitting across OFDM subcarriers based on the channel coherence time, at 310. For example, the antenna selection module 122 may need to select the same size of set of antennas across all the OFDM subcarriers (i.e., a same number of antennas in the selected set), due to regulations. In this example, the size of the set may be adjusted based on the channel coherence time, where the size of the set is larger for shorter channel coherence time, and vice versa.

Method 300 also includes selecting the set of antennas for each subcarrier based on a signal-to-noise ratio (SNR) of each antenna from the plurality of antennas, where the size of the selected set is equal to the optimal number determined, and where antennas having highest SNR gain are first selected until the optimal number is reached. For example, the antenna selection module 122 may select the set of antennas based on SNR gains of the antennas. The antennas are selected for each OFDM subcarrier until the global optimal number is achieved for each OFDM subcarrier.

Figure 4:
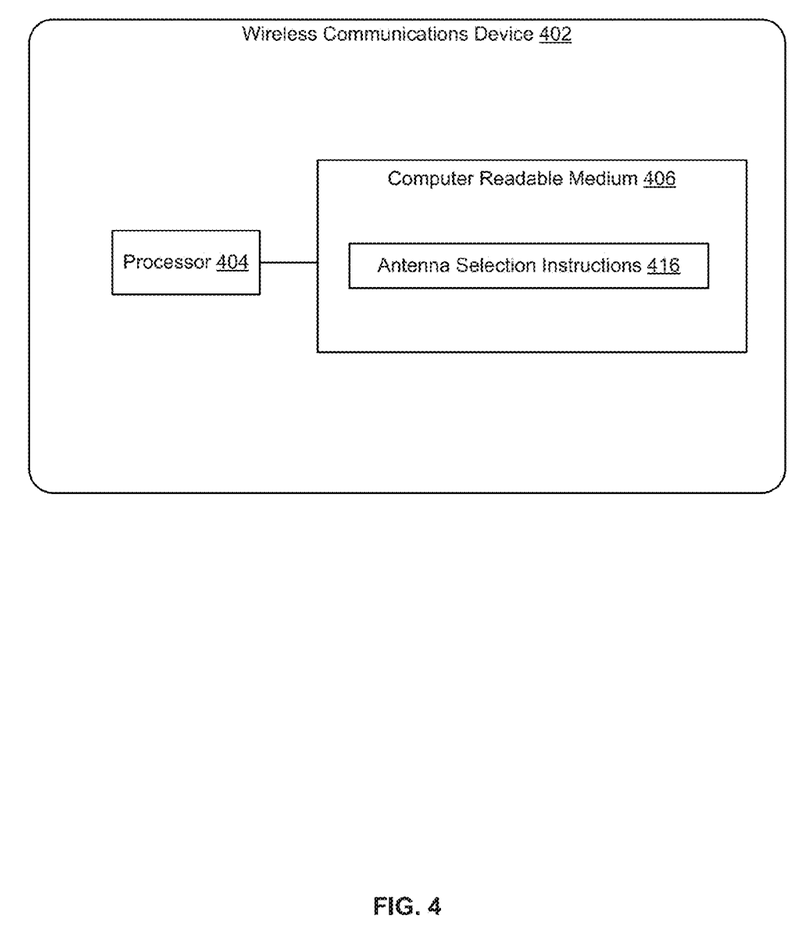
FIG. 4 is a block diagram of a wireless communications device including a computer-readable-medium having instructions for selecting transmit antennas.

FIG. 4 is a block diagram of a wireless communications device 402 including computer-readable medium having instructions for selecting transmit antennas, according to one example. The device 402 can include a non-transitory computer-readable medium 406. The non-transitory computer-readable medium 406 can include instructions 416 that if executed by a processor 404 can cause the processor to select a set of antennas for transmitting data streams.

For example, antenna selection instructions 414 are executable to select a set of antennas from a plurality of antennas to transmit a plurality of data streams to a client device based on channel state information (CSI) of a communications channel between the plurality of antennas and a plurality of receive antennas at the client device, a number of data streams to be transmitted, and a channel coherence time of the communications channel. A size of the set is greater than or equal to the number of data streams to be transmitted and the size of the set is subject to a transmit power requirement of the communication device.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations therefrom. It is intended that the appended claims cover such modifications and variations as fall within the true spirit and scope of the invention.

What is claimed is:

1. A method for selecting transmit antennas at a wireless communications device, comprising:
    selecting a set of transmit antennas from a plurality of transmit antennas for transmitting data streams on a plurality of subcarriers according to an optimization solution, the optimization solution comprising:
    maximize $F(H, N_s, T_c, S_{tx})$,
        wherein H is a channel state information (CSI) matrix based on a CSI of a communications channel between the plurality of transmit antennas and a plurality of receive antennas at a client device,
        wherein $N_s$ is a number of data streams to be transmitted from the wireless communications device to the client device,
        wherein $T_c$ is a channel coherence time of a channel between the wireless communications device and the client device,
        wherein $S_{tx}$ represents the set of transmit antennas and is a control parameter of the function F, and
        wherein $S_{tx}$ is selected such that $|S_{tx}| >= N_s$.

2. The method of claim 1, wherein a size of the set of $S_{tx}$ is subject to transmit power requirements,
    wherein the CSI includes at least one of a full CSI of the channel between the wireless communications device and the client device, and an incomplete CSI of the channel between the wireless communications device and the client device,
    wherein the full CSI is determined based on a channel sounding standard performed by at least one of the wireless communications device and the client device, and
    wherein the incomplete CSI is inferred from a packet transmitted from the client device to the wireless communications device.

3. The method of claim 2, comprising applying optimization solution techniques to an optimization function to obtain an optimal set of transmit antennas.

4. The method of claim 1, wherein the optimization is performed for each subcarrier of the plurality of subcarriers, and wherein the plurality of subcarriers are orthogonal frequency-division multiplexing (OFDM) subcarriers.

5. The method of claim 4, comprising selecting from the plurality of transmit antennas a different number of transmit antennas for each OFDM subcarrier.

6. The method of claim 4, comprising selecting from the plurality of transmit antennas a same number of transmit antennas for each OFDM subcarrier.

7. The method of claim 6, wherein selecting the same number of transmit antennas for each OFDM subcarrier comprises:
    determining an optimal number of transmit antennas to use for transmitting across the OFDM subcarriers based on the channel coherence time; and
    selecting the set of transmit antennas based on a signal-to-noise ratio (SNR) of each transmit antenna from the plurality of transmit antennas, wherein a size of the selected set is equal to the determined optimal number, and wherein transmit antennas having the highest SNR gain are first selected until the optimal number is reached.

8. The method of claim 7, wherein the optimal number is in a range from the number of data streams to the number of plurality of transmit antennas.

9. The method of claim 6, wherein the set of transmit antennas for each OFDM subcarrier is a different set of transmit antennas.

10. A wireless communications device comprising:
a plurality of transmit antennas to transmit a number of data streams to a client device; and
a transmit antenna selection module to select a set of transmit antennas from the plurality of transmit antennas based on a computation of an optimization solution, the optimization solution comprising:
maximize $F(H,N_s,T_c,S_{tx})$,
wherein H is a channel state information (CSI) matrix from the wireless communications device to the client device,
wherein $N_s$ is the number of data streams to be transmitted from the wireless communications device to the client device,
wherein $T_c$ is a channel coherence time of a channel between the wireless communications device and the client device,
wherein $S_{tx}$ represents the set of transmit antennas and is a control parameter of the function F, and
wherein $S_{tx}$ is selected such that $|S_{tx}|>=N_s$,
wherein a size of the set of $S_{tx}$ is subject to a transmit power constraint.

11. The device of claim 10, wherein the wireless communications device is a communications node of a wireless network.

12. The device of claim 10, wherein the wireless communications device is a device that communicates using orthogonal frequency-division multiplexing (OFDM) techniques, and wherein the data streams are transmitted over a plurality of OFDM subcarriers.

13. The device of claim 10, wherein the set of transmit antennas is selected based on a signal-to-noise ratio (SNR) of each transmit antenna from the plurality of transmit antennas, wherein the size of the selected set is equal to a determined optimal number, and wherein transmit antennas having the highest SNR gain are first selected until an optimal number is reached.

14. A non-transitory computer-readable storage medium comprising instructions that, when executed by a processor of a wireless communications device, causes the processor to:
select a set of transmit antennas from a plurality of transmit antennas to transmit a plurality of data streams to a client device based on a solution of an optimization function, the optimization function comprises:
maximize $F(H,N_s,T_c,S_{tx})$,
wherein H is a channel state information (CSI) matrix from the wireless communications device to the client device,
wherein $N_s$ is a number of data streams to be transmitted from the wireless communications device to the client device,
wherein $T_c$ is a channel coherence time of a channel between the wireless communications device and the client device,
wherein $S_{tx}$ represents the set of transmit antennas and is a control parameter of the function F, and
wherein $S_{tx}$ is selected such that $|S_{tx}|>=N_s$,
wherein a size of the set of $S_{tx}$ is subject to a transmit power requirement of the wireless communications device.

15. The non-transitory computer-readable storage medium of claim 14, wherein H is a partial CSI matrix inferred from a precoding matrix.

* * * * *